United States Patent Office 2,758,423
Patented Aug. 14, 1956

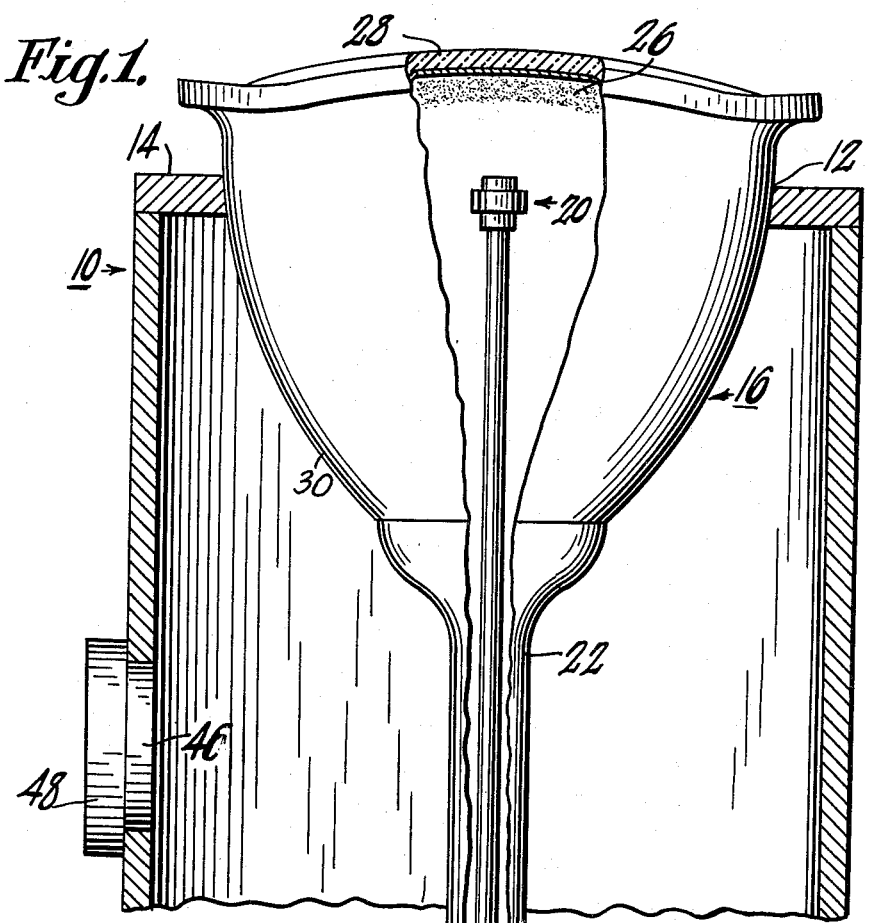
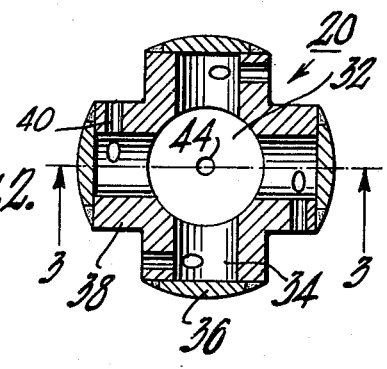
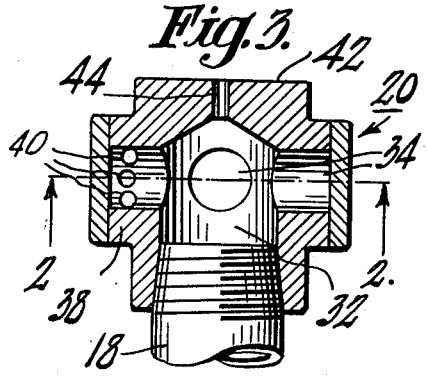

2,758,423

NOZZLE FOR REMOVING ADHERENT MATERIALS

Homer A. Lande, Marion, Ind., assignor to Radio Corporation of America, a corporation of Delaware Application December 3, 1952, Serial No. 323,755

1 Claim. (Cl. 51—11)

This invention relates to cathode ray tubes and particularly to apparatus for removing fluorescent materials from viewing screens of such tubes.

A cathode ray tube is one having an elongated envelope with an electrode structure or electron gun at one end for forming a cathode ray beam which is focused and scanned over a fluorescent screen at the other end of the envelope to produce an image or picture thereon. Such a fluorescent screen may comprise blue fluorescing zinc sulfide and yellow fluorescing zinc cadmium sulfide in the desired proportions to provide a white luminescence, for example. In the manufacture of the tube, the phosphors are mixed with other materials, such as a water soluble silicate binder, for example, which facilitate settling the phosphors on and their adherence to the glass face plate of the cathode ray tube.

During the manufacture of cathode ray tubes, a substantial number of tubes are rejected as failing to meet certain standards of performance. Since the tube components, especially the tube envelope, are costly, an effort is made to salvage parts which may be re-processed and used in other tubes. In the case of the tube envelope, re-processing usually involves removal of the fluorescent materials or phosphors from the viewing screen or face plate of the tube.

In the past, fluorescent materials have been removed from cathode ray tubes by means of acid solutions. This method has proven satisfactory for use with glass cathode ray tubes (or kinescopes, as television picture tubes are usually called) and some metal tubes. However, the present trend is to construct the metal envelopes of kinescopes of cold rolled steel, which is much cheaper than the high chrome steels now used for that purpose. The use of cold rolled steel in the cone of the tube requires that a glass having a high coefficient of thermal expansion be used for the face plate and the glass neck of the tube. Both the glass and cold rolled steel are by their nature characterized by poor resistance to chemical attack, so use of acids as a means for removing phosphor materials cannot be used in this case.

Another disadvantage of using acid to remove fluorescent materials from screens is that chemical reactions take place with the phosphors as well as the wanted reaction with the silicate which is used to make the screen adhere to the face plate. Consequently, the phosphors thus removed are wasted, because the cost of salvaging the phosphor and reclaiming it is more than the cost of preparing new phosphors. Additional disadvantages of acid removal of screens are that toxic by-products may be produced by chemical reaction between acid and the phosphors, and the fact that the acid itself is rather costly.

A principal object of the present invention is to provide an improved means for removing fluorescent screens from cathode ray tubes.

A further object of the present invention is to provide a means for removing phosphors from a cathode ray tube in a readily salvageable form.

Another object of the present invention is to provide a means for removing fluorescent screens from kinescope face plates which is free from the dangers of toxicity which were inherent in the prior art method.

Yet another object of the present invention is to provide a novel and more economic means for removing screens from cathode ray tubes.

The above and related objects are accomplished in accordance with the present invention by directing a high velocity rotating air mass towards the phosphor screen. The high velocity of the rotating air mass, which resembles a miniature hurricane, insures a mutual friction force between the air mass and phosphor particles which is of sufficient magnitude to overcome the adhesive and cohesive particles formed by the binding substances incorporated within the screen.

A novel type of non-rotating nozzle or jet head, hereafter referred to as the "airoter," which is inserted through the neck of the tube, contains tangential orifices which, when high velocity air is released therethrough, sets up the rotating air mass. Because the rotating air mass, like a hurricane, has a relative calm center or eye, it would be inefficient in removing the phosphors at the central portion of the screen. Therefore, to insure removal of the phosphors over the entire screen, the airoter is provided with an additional orifice through which air is directed towards the center of the face plate, thus dislodging phosphor particles which otherwise would adhere in that region.

The compressed air which is used in the practice of the present invention may be produced much more cheaply than the hydrofluoric acid formerly used to remove fluorescent screens. Additional savings, brought about by a reduction of the time spent in washing the tube envelope after screen removal, may also be realized. While air is the gas referred to in the description of the present invention, other gases could be used, especially if air would cause excess oxidation of parts.

Referring to the accompanying drawings:

Fig. 1 is an elevational view of apparatus which may be employed in the practive of the method of the present invention, a part of said apparatus being inserted within a cathode ray tube envelope from which the fluorescent screen is to be removed;

Fig. 2 is an enlarged plan view, in section, of the nozzle shown in Fig. 1, and taken along the lines 2—2 of Fig. 3, Fig. 3 is an elevational view, in section, taken along lines 3—3 of Fig. 2.

Referring to Fig. 1, there is shown an enclosed table 10 having an aperture 12 in its top 14 which is shaped to hold a cathode ray tube envelope or bulb 16 and center said bulb with respect to an air line 18 and nozzle 20. When the tube envelope 16 is in place on the table 10, the air line 18 and nozzle 20 extend into the interior of the envelope 16 through the neck 22 of the bulb 16. The air line 18 has a shut-off valve 24 for controlling air flow therethrough, and a novel nozzle or airoter 20 for directing high velocity-high pressure air through tangential orifices therein to produce a swirling or rotating air mass which loosens and removes the fluorescent screen 26 on the face plate 28 of the cathode ray tube envelope 16. The cone 30 of the tube envelope 16 is illustrated as being metal, but may be either metal or glass.

The nozzle or airoter 20, shown in detail in Figs. 2 and 3, and which is threaded so that it may be screwed onto the end of the air line 18 which is extended into the tube envelope 16, has a large central chamber 32 and four somewhat smaller channels 34 illustrated as being substantially perpendicular to, equispaced around the periphery of, and extending into the large central chamber or channel 32. The outer end of each of the channels 34 is closed off by a cover plate 36 which is brazed or otherwise sealed and secured to the body 38 of the nozzle.

The nozzle 20 has at least one, and, as illustrated in Figs. 2 and 3, has three small tangential, channeled orifices 40 extending from the outer surface of the body 38 into each of the channels 34. The cover plate 42, which closes one end of the central channel 32, has a single centrally located aperture or orifice 44.

The table 10 has a filter 46 and exhaust means, such as a fan 48, for removing excess air from the enclosed table 10 while confining the removed phosphor particles to the enclosure. Variations in the physical arrangements and number of the tangential orifices may be made to satisfy specific requirements.

In the practice of the present invention, the bulb 16 from which the fluorescent screen 26 is to be removed is positioned with its periphery seated in the aperture 12 of the table 10 with the air line 18 and nozzle or airoter 20 inserted through the neck 22 of the tube envelope and extending into the interior of the cone 30. The valve 24 on the air line 18 is then opened, and high pressure-high velocity air escapes from the tangential orifices 40 of the airoter 20 and the single longitudinal orifice 44. When the air escapes from the tangential orifices 40, its static pressure is converted into a kinetic head and a torque is imposed on the entire air mass contained within the bulb or envelope 16. The torque thus produced results in the angular acceleration of the entire air mass, and this acceleration continues until the air mass has attained an angular velocity such that a counter torque, equal in magnitude to the torque produced by the air leaving the airoter, and provided by the friction of the air mass upon the interior surfaces of the bulb assembly and by turbulence within the air mass, is manifested. The air mass within the bulb thus attains a constant angular velocity the magnitude of which is dependent upon the operating conditions, that is, the air pressure within the airoter 20, the number, length, and diameter of tangential orifices 40, and the size and form of the bulb or envelope assembly 16. As the air mass gains velocity, it exerts a frictional force upon the phosphor particles adhered to the face plate 28, and if the operating conditions are so adjusted as to render the velocity of the air mass sufficiently high, the frictional forces exerted upon the phosphor particles will cause them to become dislodged from the face plate 28. The rotating air mass may be likened to a miniature hurricane within the tube envelope 16.

Since the magnitude of the frictional force on the phosphor particles by the rotating air mass at any point varies directly with the linear velocity of the air mass at that point, it is obvious that the linear velocity of the air mass, and thus the frictional forces exerted by the air mass, will be insufficient to readily dislodge the phosphor particles in the immediate vicinity of the center of rotation of the air mass. Moreover, since the longitudinal center line of the bulb assembly 16 is colinear with the center of rotation of the air mass, and since the longitudinal center line of the bulb assembly 16 intersects the face plate 28 at the geometric center of the latter, it is evident that phosphor particles at the center of the face plate 28 may be removed only with difficulty if at all, by the rotating air mass alone. It is for this reason that the airoter 20 is provided with one centrally located longitudinal orifice 44 which directs a jet of high velocity air to the center of the face plate 28, which is at the center or eye of the "hurricane," thereby dislodging phosphor particles which might otherwise remain adhered there.

As a specific example of how the present invention is practiced, the distance between the nozzle or airoter 20 and the face plate 28 is approximately six to eight inches in the case of a 21 inch metal rectangular tube. For smaller tubes, such as a 17 inch kinescope for example, this distance should be somewhat less than six to eight inches for optimum efficiency in removing the screen 26. The nozzle or airoter 20, as illustrated in Figs. 2 and 3, has 12 tangential orifices (4 banks of 3 orifices) arranged in pinwheel fashion, each orifice having a diameter of 1/16 inch and each bored on 3/32 inch centers. The perpendicular distance from the center of the airoter to the orifices 40 is 3/8 inch. The effective length of each of the orifices 40 is somewhat in excess of 1/8 inch. The air pressure within the airoter 20 is maintained at approximately 70 pounds per square inch gauge pressure, during screen removal. Under these conditions, the fluorescent screen 26 will be removed in approximately three seconds. However, in actual practice, the same setup is employed for both 17 and 21 inch tubes, and the distance between airoter 20 and the face plate 28 is a compromise between the optimum for each of the two tube sizes. Under these conditions, a time cycle of six seconds has been found sufficient to insure complete removal of the screen 26 in either size tube.

Following removal of the screen 26, the bulb 16 is subjected to washings with water and in some cases with water, then water plus detergent, and then a final washing with water. A washing schedule of 15 seconds for each washing has been found to be satisfactory, but a substantial variation in the time schedule would be permissible.

The particles of phosphor which are removed from the face plate 28 (or other viewing screen surface which may be inside the tube envelope) function as an abrasive to augment the frictional action between the rotating air mass and the screen in removing the phosphors.

This abrasive action of the loosened phosphor particles may, if the distance between the airoter 20 and the face plate 28 is too small, damage the inner surface of the face plate 28. Under such conditions the phosphors loosened by the swirling air mass are thrown into the path of the air escaping from the single longitudinal orifice 44 and apparently exert an erosive effect on the center region of the tube which is similar to that produced by sandblasting. However, the optimum spacing between nozzle 20 and face plate 28 for any particular tube size may readily be determined by experiment.

The air line 18 should be small enough to provide sufficient room for the air to escape from the bulb 16, yet large enough to provide sufficient volume of air to accomplish the desired result, which is efficient removal of the screen 26. The table 10 is enclosed to prevent the phosphor particles ejected through the tube neck 22 from being scattered. The filter 46 and exhaust means 48 illustrated as being attached to the table 10, remove air and suspended phosphor particles from the table 10 and thus maintain near-normal atmospheric pressures within the enclosed table 10.

While air alone has proven satisfactory to remove the vast majority of fluorescent screens commonly used in cathode way tubes, some screens, particularly screens which may be aluminized, are provided with a high-silicate binder to provide stronger adherence of the screen to the face plate and thus are more difficult to remove from the face plate 28. With such screens, the addition of a water soluble abrasive (sodium carbonate, for example) to the air supply will improve the efficiency of the screen removal operation.

The addition of the water soluble abrasive presents no additional problems to the reclaiming of the salvaged phosphors, since the phosphors would in any event be washed with water to dissolve the silicate type binder used to cause the screen 26 to adhere to the face plate 28.

If the phosphors are to be reprocessed, the enclosed table 10 and filter and exhaust for enclosures should be made of stainless steel or some other material which will not contaminate the phosphors.

While the apparatus for the practice of the present invention as described heretofore is suitable for removing fluorescent screens on a small scale, the present invention is well adapted for use in high speed mass production screen removal. In such an operation the operator places the tube envelope 16 into a receptacle of a multiple position rotary unit (not shown), the envelope 16 then is transported through the rotating air mass screen removal step and through a series of washing steps, and finally removed from the unit as a cleaned tube envelope which may then go back into the normal factory tube production routine.

Thus it is apparent that the present invention provides an improved and more economical apparatus for removing fluorescent screens from cathode ray tube viewing screen surfaces. Furthermore, the phosphors thus removed are readily salvageable, there is no chemical reaction which may result in toxic gases being evolved as when acid removal processes are used, and the apparatus, though well adapted for mass production manufacturing techniques, may be used to equal advantage in small scale manufacturing operations.

What is claimed is:

A nozzle having a body portion provided with a central chamber for receiving a low velocity high pressure gas, said chamber having a longitudinal axis, a plurality of channels communicating with said central chamber and extending radially therefrom and having their remote ends closed off, a plurality of non-rotatable restricted outlet passageways, at least one for each channel, extending from said channels to the outer surface of said body portion in the same circular direction with respect to said axis, said channels and said passageways having their axes substantially normal to each other, each of said plurality of passageways being tangent to a circle drawn with its center substantially at said longitudinal axis and in a plane which is normal to said longitudinal axis, whereby said gas may issue in high velocity tangential jets, and a restricted outlet passageway communicating with said central chamber and substantially parallel with said longitudinal axis.

References Cited in the file of this patent

UNITED STATES PATENTS

| | | |
|---|---|---|
| 763,647 | Walter | June 28, 1904 |
| 843,555 | Weymar | Feb. 5, 1907 |
| 1,518,449 | Plantinga | Dec. 9, 1924 |
| 1,531,275 | Culp | Mar. 31, 1925 |
| 1,701,066 | Elkington | Feb. 5, 1929 |
| 1,789,977 | Hopkins | Jan. 27, 1931 |
| 1,944,404 | Coble | Jan. 23, 1934 |
| 1,987,345 | Meyer | Jan. 8, 1935 |
| 2,155,986 | Wheaton | Apr. 25, 1939 |
| 2,162,228 | Pierce | June 13, 1939 |
| 2,227,734 | Meyer | Jan. 7, 1941 |
| 2,563,130 | Mylchreest | Aug. 7, 1951 |

FOREIGN PATENTS

| | | |
|---|---|---|
| 38,533 | Sweden | Mar. 10, 1915 |
| 445,354 | Germany | June 10, 1927 |
| 640,670 | Germany | Jan. 9, 1937 |